(No Model.)

J. SCOTLAND & F. CORDON.

FISHING HOOK AND DEVICE FOR CAPTURING FISH.

No. 336,953. Patented Mar. 2, 1886.

Witnesses.
S. N. Piper
W. B. Torrey

Inventor
James Scotland.
Francois Cordon.
by R. H. Eddy atty.

UNITED STATES PATENT OFFICE.

JAMES SCOTLAND AND FRANÇOIS CORDON, OF ST. PIERRE, NEAR MIQUELON.

FISHING HOOK AND DEVICE FOR CAPTURING FISH.

SPECIFICATION forming part of Letters Patent No. 336,953, dated March 2, 1886.

Application filed December 29, 1885. Serial No. 187,008. (No model.)

*To all whom it may concern:*

Be it known that we, JAMES SCOTLAND, a subject of the Queen of Great Britain, and FRANÇOIS CORDON, a citizen of the Republic of France, residing in St. Pierre, near the Island of Miquelon, off the coast of Newfoundland, have invented a new and useful Improvement in Fishing Hooks or Devices for Capturing Fish; and we do hereby declare the same to be described in the following specification, and represented in the accompanying drawings, of which—

Figure 1:
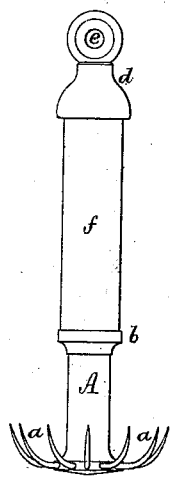
Figure 2:
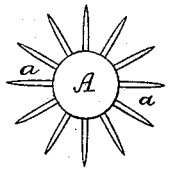
Figure 3:
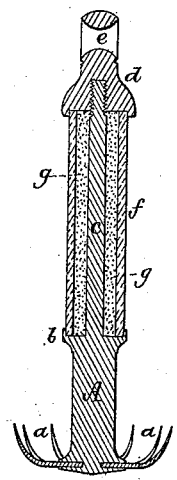

Figure 1 is a side elevation, Fig. 2 a bottom view, and Fig. 3 a longitudinal section, of a fishing hook or implement embodying our invention, the nature of which is defined in the claim hereinafter presented.

In carrying out our said invention we have the shank of the hook provided with a luminous or light-producing material—as phosphorus, for instance—inclosed within a water-tight and transparent tube or case applied to or making part of such shank. To the said shank we have below its light-producing portion one or a series of curved and pointed prongs, and in the upper part of the shank an eye or means of securing the hook to a line. The fishing hook or device of such construction is, when fixed to such line, to be lowered into the water or sea. In consequence of the light emanating from the phosphorus or light-producing material fishes in large numbers will generally be attracted to or toward the hook, and, getting directly over the pointed prongs thereof, can be caught or hooked by quickly pulling upward the light-giving fishing-hook, so as to cause one or more of its prongs to enter the fish or fishes near them. If desirable, each of the prongs may be barbed like an ordinary fish-hook.

Our invention will be found very useful in fishing for caplin, squid, herring, and various other small fish.

In the drawings, A denotes the shank of the hook, provided at its lower end with a series of curved and pointed prongs, *a*, radiating from it and each turned upward, as represented. At a short distance above the prongs the shank is flanged or formed with a shoulder, *b*, from which there projects concentrically with it a stem or rod, *c*, screw-threaded at its upper end to engage with a head, *d*, provided with an eye, *e*. This head and the shoulder are socketed or recessed to receive and fit closely to the ends of a glass tube, *f*, extending between them or from one to the other of them, encompassing the stem *c*, and filled or charged with phosphorus or some suitable light-emitting means or composition, *g*. The tube at its ends is to be hermetically sealed or to have water-tight joints with the shoulder and head.

We do not claim an artificial fish-bait provided with one or more hooks and coated externally with a substance which is luminous in darkness, nor do we claim as a fish-bait a glass vessel having an inner lining of metal or coloring substance to reflect without producing light when the bait is in the water.

We claim—

The fishing hook or implement, substantially as described, consisting of the shouldered shank and its series of curved and pointed prongs and screw-threaded stem, the head screwed upon such stem, and the glass tube surrounding the stem and containing a charge of phosphorus or a light-giving material, all being arranged essentially and for use as set forth.

JAMES SCOTLAND.
FRANÇOIS CORDON.

Witnesses:
HENRY CLINTON,
R. O. SHEEHAY.